United States Patent [19]                                      [11]   4,114,654
Richardson                                                  [45]   Sep. 19, 1978

[54] TUBE PLUG

[75] Inventor: Arthur William Richardson, Kendal, England

[73] Assignee: Furmanite International Limited, Cumbria, England

[21] Appl. No.: 733,985

[22] Filed: Oct. 20, 1976

[30] Foreign Application Priority Data

Feb. 19, 1976 [GB]  United Kingdom ............... 6692/76

[51] Int. Cl.² ........................................... F16L 55/18
[52] U.S. Cl. ....................................... 138/89; 122/364; 138/97; 165/76
[58] Field of Search ................... 29/460; 61/36 R, 63; 122/364; 138/89, 97; 165/76; 156/294, 305; 277/117, 118

[56] References Cited

U.S. PATENT DOCUMENTS

| 2,960,831 | 11/1960 | Lonaberger et al. | 61/36 R |
| 3,568,721 | 3/1971 | Ross et al. | 138/97 |
| 3,691,609 | 9/1972 | Ice et al. | 138/89 X |

*Primary Examiner*—Richard E. Aegerter
*Assistant Examiner*—Frederick R. Schmidt
*Attorney, Agent, or Firm*—William Anthony Drucker

[57] ABSTRACT

A bore plug comprises a deformable sleeve to fit inside a bore to be plugged, two tapered members interfitting with the sleeve to engage opposite ends thereof, and an intercoupling of the tapered members actuatable to draw the latter together and deform the sleeve into circumferential engagement with the interior of the bore at or near each end of the sleeve. Provision of bored channels in one of the tapered members and the sleeve allows introduction of flowable sealing material after deformation of the sleeve.

10 Claims, 2 Drawing Figures

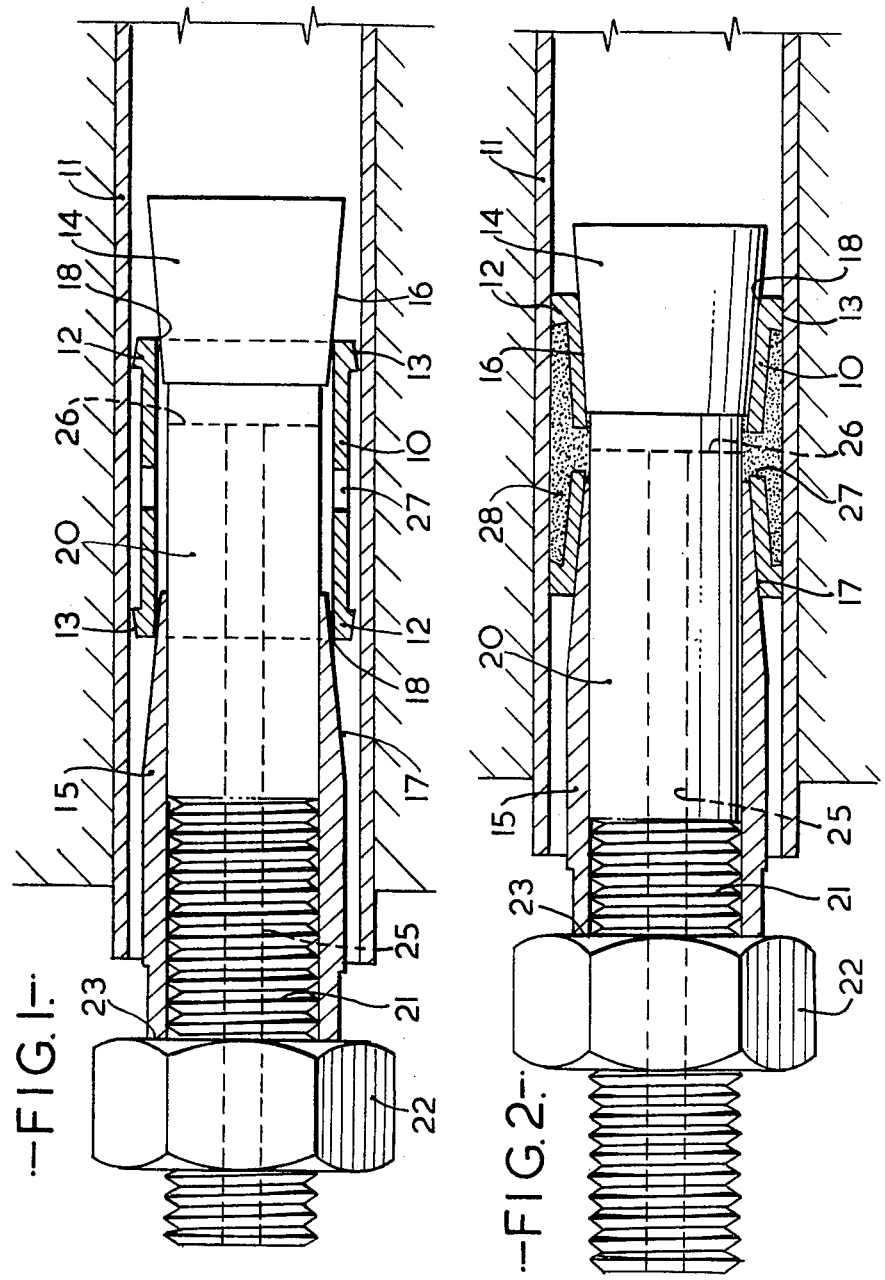

TUBE PLUG

The invention relates to tube or bore plugging and has particular, but not exclusive, application to isolating defective heat exchanger tubes.

Heat exchangers are widely used in many processes and applications in the chemical and power supply industries. A conventional construction for heat exchangers may make use of a housing vessel having, or fitted with, flanging to which a plurality of U-shaped tubes are fitted to carry a heat exchanger fluid. These tubes may have to withstand substantial pressures, say up to 2,000 psi. Where such tubes develop leaks, whether due to corrosion or for other reasons, it has been a common practice to plug them with a wedge driven into an end of the defective tube, but with only moderate success.

It is an object of the invention to provide an alternative way of plugging tubes or bores with an improved likelihood of success.

According to the invention there is provided a tube or bore plug comprising a deformable sleeve to fit inside a tube to be plugged, two tapered members interfitting with the sleeve to engage opposite ends thereof, and an intercoupling of the tapered members whereby they are drawn together to deform the sleeve into circumferential engagement with the interior of the tube at each end of the sleeve.

Preferably the tapered members have their tapers fit into and engage the internal edges of the sleeve which may be formed with an external ridge at or near each of its ends. Such ridges may be shaped to coact with the tube wall on spreading thereof by the tapers in order to assist the deformable sleeve to buckle inwardly at its mid region rather than outwardly.

In one particular application an elongated member, say of tube or rod-like form, has a head or end that is relatively enlarged and tapered to constitute one of said tapered members, and a sleeve-like collar with one tapered end which fits over the elongated rod or tube-like member to constitute the other of said tapered members, the other end of the rod or tube-like member is adapted to cooperate in drawing the tapered members together, preferably by being threaded so that a nut may coact with the other end of the tapered sleeve or collar to draw said tapered members together.

Preferably, at least after deformation of the sleeve, there will be a space between the sleeve and the bore, and the plug has a passageway for the introduction into that space of a sealing material. For a tube-like member cross-bores or ports may be formed at the position of the deformable sleeve, that is between the tapered head or end and the tapered sleeve or collar, for the injection of sealing compound after, before, or during deformation, the deformable sleeve advantageously being ported to pass such sealing compound to both sides thereof.

One specific embodiment of the invention will now be described, by way of example, with reference to the accompanying drawings, in which:

FIG. 1 is a section through a tube or bore plug assembled but not yet drawn into sealing relation with a tube bore to be plugged; and FIG. 2 is a similar sectional view after drawing the plug of FIG. 1 into sealing engagement with the tube bore. In the drawings, a deformable sleeve 10 is shown capable of sliding inside a tube 11 to be plugged. The deformable sleeve 10 is shown with external ribs 12 close to each of its ends and formed with tapered external surfaces 13 converging towards the ends of the sleeve 10.

Two tapered members 14 and 15 are shown fitting into and engaging at their tapers, 16 and 17 respectively, the internal edges 18 at the ends of the deformable sleeve 10. The member 14 comprises an enlarged head or end of a generally tubular part 20 about which the sleeve-like tapered member 15 makes a sliding fit. At its other end the tube-like part 20 is threaded at 21 to take a nut 22 which can bear against the free end 23 of the sleeve-like tapered member 15 to coact therewith in forcing or drawing the members 14 and 15 together to deform the sleeve 10 as shown in FIG. 2, where it can be seen that the tapers 13 on the end ridges 12 advantageously take a position substantially parallel to the tube walls as the sleeve 10 deforms. In this way such tapers 13 help predispose the mid-part of the deformable sleeve 10 collapse inwardly rather than buckle outwardly due to pivoting action at the inner corners of the ridges.

The tube-like member 20 has an internal bore 25 that is intersected adjacent to the head part 14 by one or more cross-bores 26 so as to communicate to the exterior of the member 20 at a position or positions within the extent of the deformable sleeve 10. Apertures 27 at about the mid-point of the sleeve 10 allow sealing compound 28 to be driven under pressure through the bores 25, 26 and apertures or ports 27 during or after, or even before, the nut is tightened to make a seal. It can be seen that the unthreaded tubular part 20 will support the tapered part of the sleeve 15, and the combined action and the position of the cross bore or bores 26 is such that the latter, after deformation of the sleeve 10, will still communicate with the apertures or ports 27.

A suitable sealing compound is that marketed by ourselves under the name FURMANITE COMPOUND.

It should be understood that although the invention and its embodiments have been referred to specifically for the purposes of tube plugging to prevent access via the tube end, it is equally applicable to sealing an access pipe or channel-way into a tube end or a bore. All that is necessary is for the head part 14 itself to have a bore which, if it communicates with the bore 25, will require separate cross bores 26 and communicating sealant feed bores if a sealant compound is to be introduced into the area of the deformed sleeve 10 independently of the bore 25.

I claim:

1. A bore plug comprising:
   (i) a deformable sleeve to fit inside a bored structure, such as a tube, to be plugged
   (ii) two tapered members interfitting with said sleeve to engage opposite ends thereof,
   (iii) a structure carrying said tapered members and permitting relative movement of said members axially of the sleeve, said structure including parts relatively movable axially of the sleeve and each coacting with a respective one of the tapered members such that by relative movement of said parts said tapered members may be drawn together axially of the sleeve to deform permanently axially-spaced portions of the sleeve into circumferential engagement with the bore, an annular chamber being then bounded by the sleeve and the bore between said circumferentially-engaged portions, said sleeve having an aperture at a position axially between said circumferentially-engaged portions, and said structure including a passageway opening within said sleeve through said aperture and communicating with said chamber way for introduction to said chamber of a flowable sealant.

2. A plug according to claim 1, wherein the tapered members have tapers that fit into and engage the internal edges of the sleeve.

3. A plug according to claim 2, wherein the sleeve has an external ridge at or near each of its ends.

4. A plug according to claim 3, wherein the ridges are shaped to contact sides of the bore when spread by the tapers and thereby assist inward buckling of a mid-region of the deformable sleeve.

5. A plug according to claim 4, wherein the ridges are tapered towards each end of the sleeve.

6. A plug according to claim 1, wherein one of the tapered members comprises an enlarged and tapered head on an elongated member of said structure.

7. A plug according to claim 6, wherein the other tapered member comprises a tapered sleeve-like collar which also fits over said elongated member.

8. A plug according to claim 7, wherein said said elongated member is threaded for cooperating with a nut to cause the nut to engage the tapered collar in drawing the tapered members together.

9. A plug according to claim 6, wherein said elongated member is a tube with a solid head and has one or more apertures adjacent the head.

10. A plug according to claim 6, wherein said elongated member is a rod with a transverse bore adjacent its said head and a longitudinal open-ended bore communicating therewith from its non-head end.

* * * * *